3,334,985
RECIPROCATING GLASS PRESSING APPARATUS

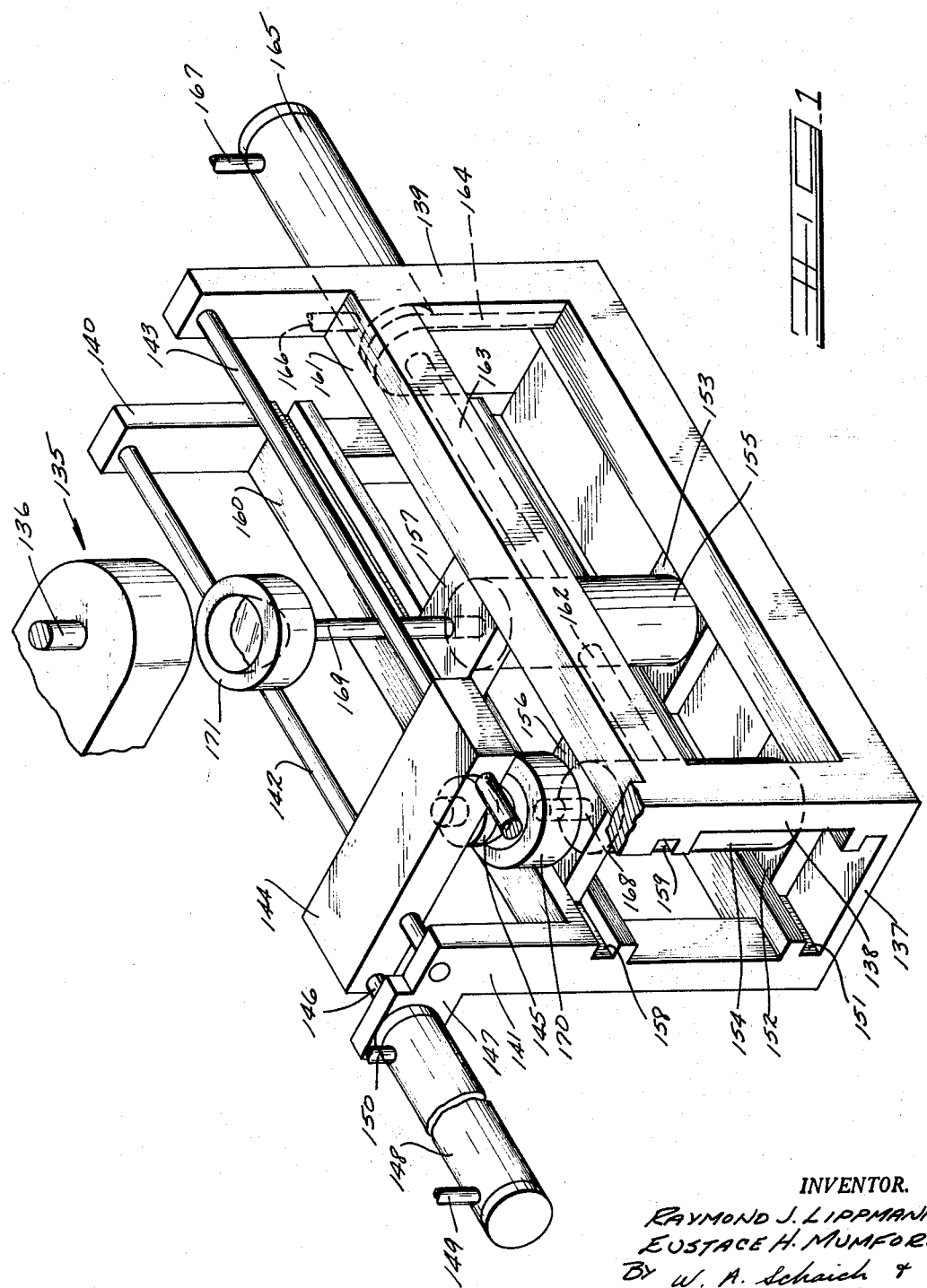

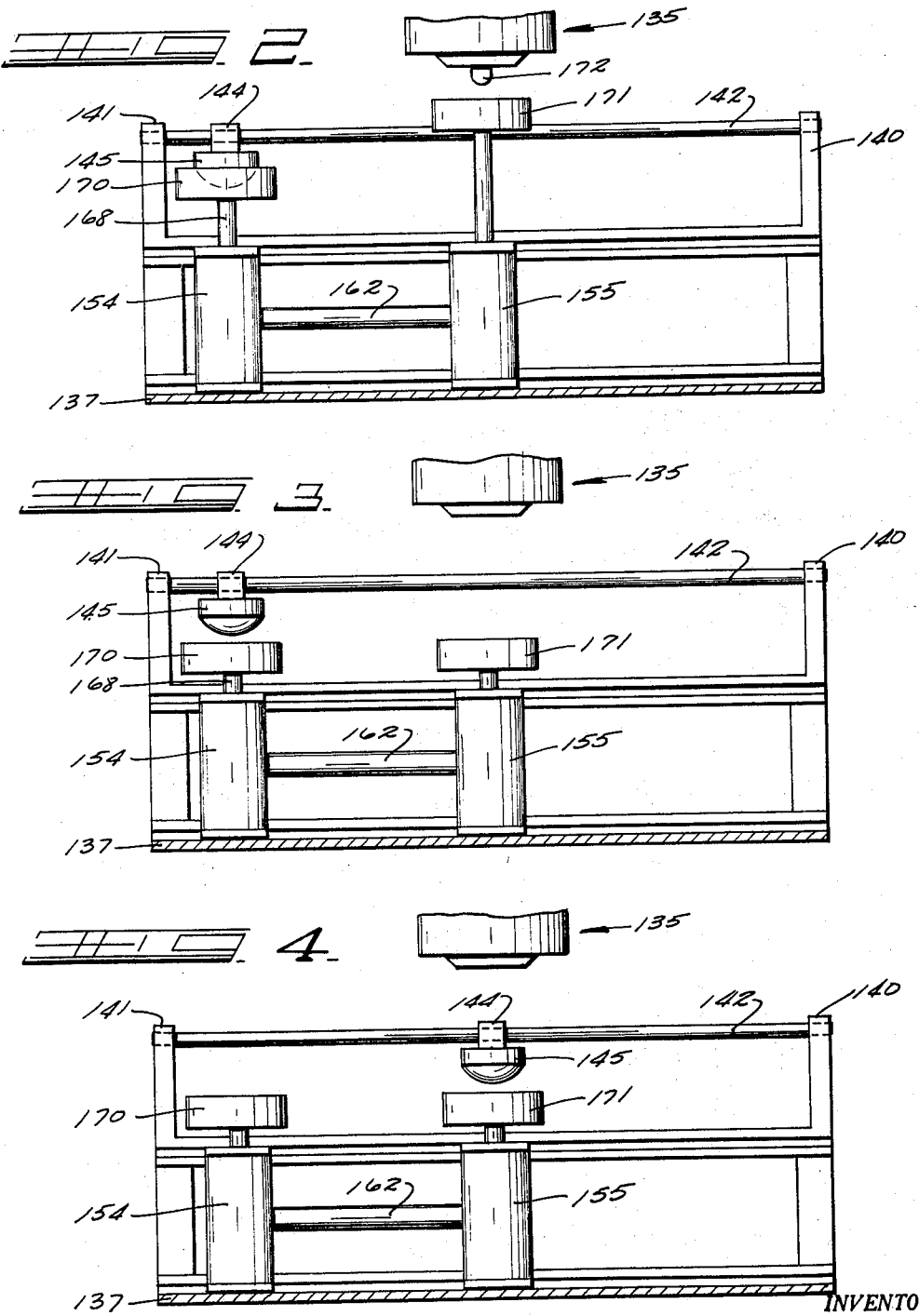

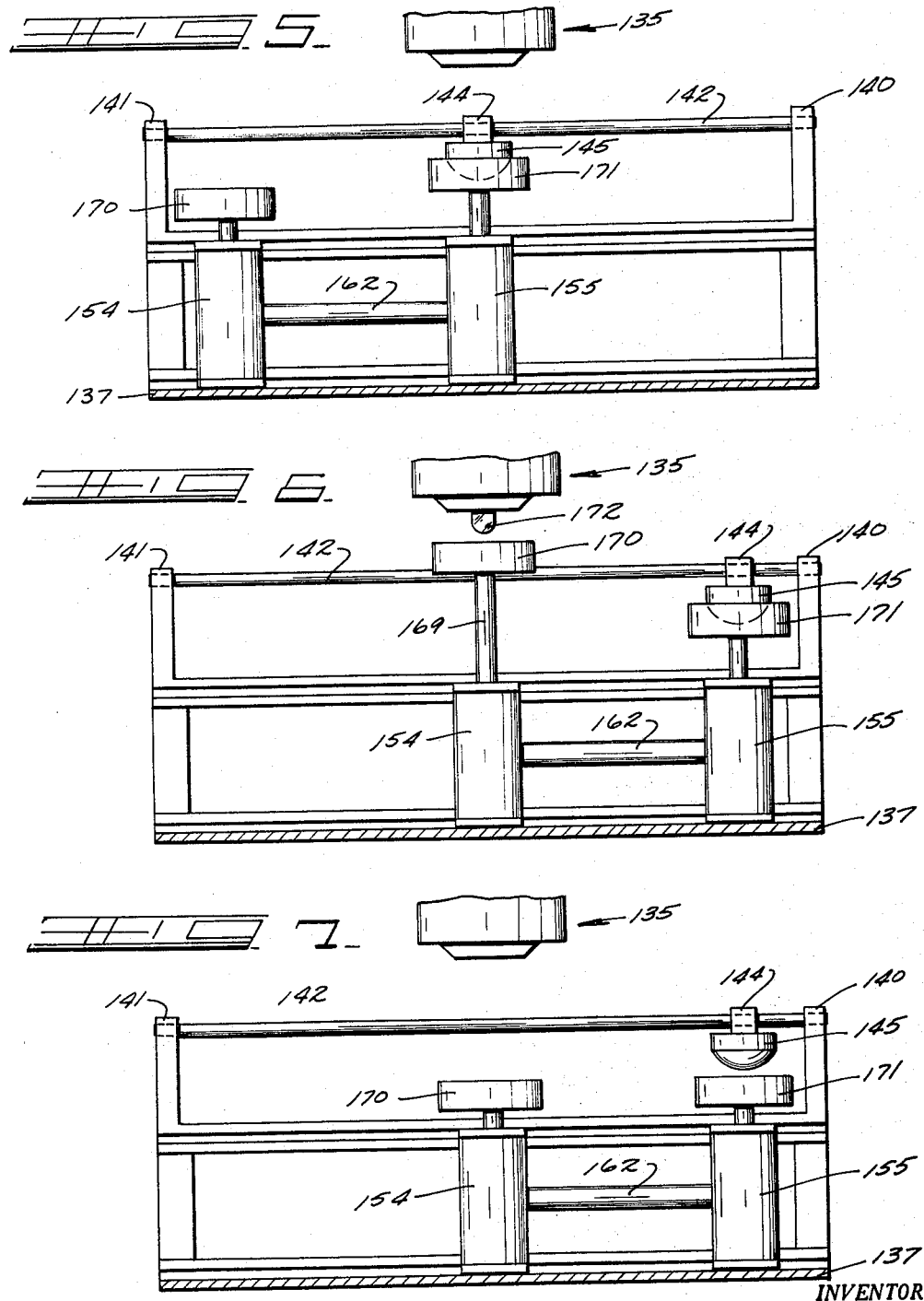

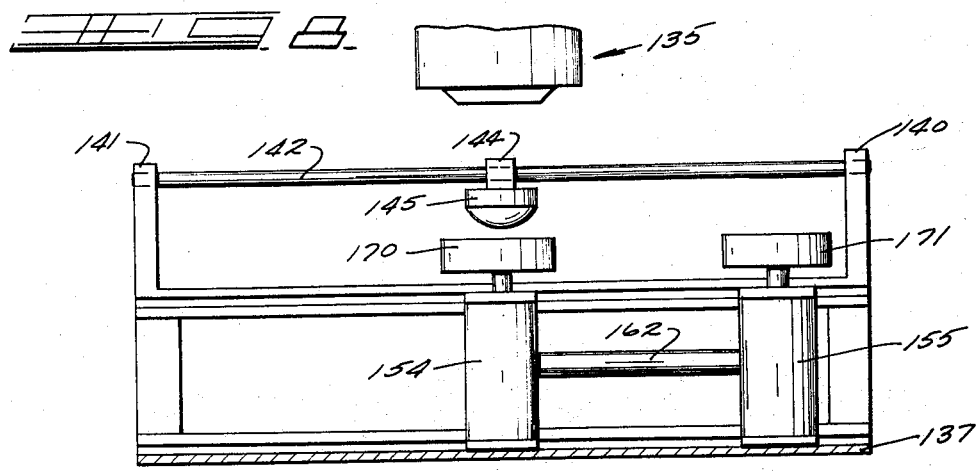
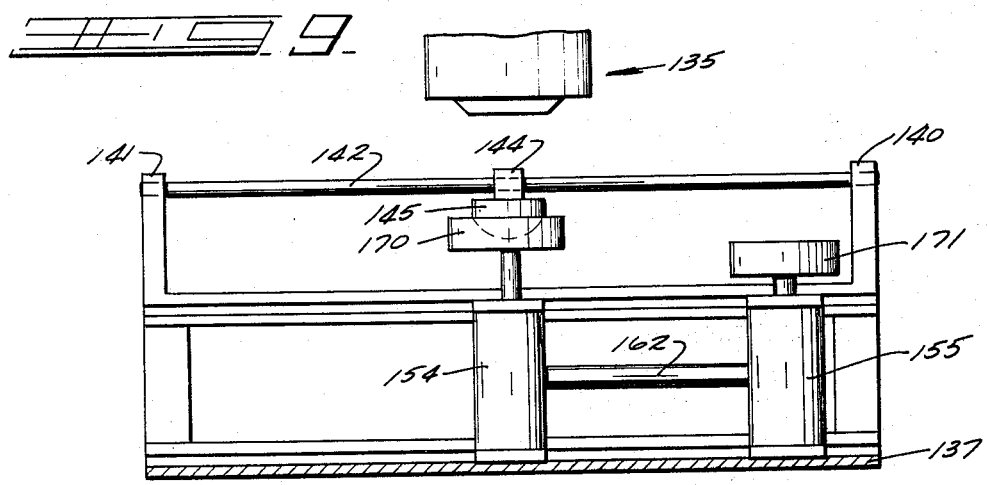

Raymond J. Lippmann, Toledo, Ohio, and Eustace H. Mumford, Ottawa Lake, Mich., assignors to Owens-Illinois, Inc., a corporation of Ohio
Original application Dec. 19, 1962, Ser. No. 245,785, now Patent No. 3,291,588, dated Dec. 13, 1966. Divided and this application Aug. 19, 1966, Ser. No. 579,466
4 Claims. (Cl. 65—226)

ABSTRACT OF THE DISCLOSURE

A glass pressing operation in which mechanism is provided for raising a mold into close proximity to a feeder to receive a charge of molten glass and then lower the mold so that a plunger may be moved into overlying relationship to the mold. The charged mold is then elevated to press form the charge into the mold cavity shape by the plunger. The plunger and mold may be moved laterally together to provide additional plunger and glass contact time and a second mold is moved into position beneath the feeder. The second mold is elevated for charging and then lowered while the plunger is removed from the first mold and moved into alignment with the second mold. The second charged mold is elevated to press the glass therein and may then be laterally shifted with the plunger therein thus moving the first mold, which has been unloaded, into position beneath the feeder.

---

This application is a division of our co-pending application S.N. 245,785, filed Dec. 19, 1962, now Patent No. 3,291,588.

This invention relates to a method and apparatus for press forming shallow articles from molten glass. More particularly, this invention relates to a method and apparatus for press forming glass articles from glass at high temperatures and while initially in a very fluid state, thus requiring specialized handling in order to prevent the formatiton of defects in the finished ware.

Conventional press forming operations contain two features which are detrimental to producing good ware from glass having a temperature-viscosity relationship, such that gobs cannot be formed due to the viscosity being below log 2 when the temperature is maintained above the liquidus. In a normal press forming operation, the vertical distance from the orifice of the feeder spout to the mold is relatively large with distances being up to several feet. No problem is encountered when the glass, at the feeding temperature, has a viscosity of log 2.5 or higher. When dropping fluid glasses having a viscosity less than log 2 through a long distance, gravity accelerates the glass to such a velocity that upon impact with the mold, the glass tends to both splatter and to move, temporarily, up the mold side walls above its normal loading height in the mold. Both of these actions will cause defects in the finished ware. It also has been the practice to move a loaded mold in a horizontal or lateral direction after loading and before pressing. This type of motion produces forces which cause the fluid glass in the mold to move up the mold side wall in certain parts of the mold. Although the glass usually settles back to a level condition in the mold prior to the pressing operation, this action of the glass produces a defect in the finished ware.

With the foregoing in mind, it is an object of this invention to provide a method of handling extremely liquid glass and forming such glass into a finished shape without producing defects.

It is another object of this invention to feed charges of extremely fluid molten glass to the forming mold in such a manner that the glass is not caused to splatter or run up the sides of the mold.

It is a further object of this invention to completely form a glass article without subjecting the glass to horizontal motion relative to the mold prior to its becoming relatively set.

It is a still further object of this invention to provide apparatus for receiving molten glass and pressing the molten glass into a finished article wherein the glass, in its molten or fluid state, is subjected to vertical motions only.

It is an additional object of this invention to provide apparatus for forming glass articles in which a plurality of molds are successively loaded and the articles pressed to final shape in a regular sequence.

Other and further objects will be apparent from the following description taken in conjunction with the attached sheets of drawings, wherein:

FIG. 1 is an isometric view of the forming apparatus of the invention;

FIGS. 2 to 9 are schematic elevational views illustrating the operating cycle of the apparatus of FIG. 1.

Referring specifically to FIG. 1, there is shown a feeder 135 which may be of the type disclosed in the co-pending application, S.N. 156,894, filed Dec. 4, 1961, now Patent No. 3,230,060 of Raymond J. Lippmann, a co-inventor in the present application. The feeder 135, as described in the above-referred-to application, is of the type in which molten glass is permitted to flow through an orifice and be periodically cut off by the operation of a plunger 136. The details of the apparatus for raising and lowering the plunger 136 to effect the opening and closing of the outlet orifice is not believed necessary for the proper understanding of this application, it being understood that the plunger or needle 136 will be raised and lowered in sequence for the proper delivery of discrete charges of glass to the forming apparatus.

It should be understood that the feeder 135 serves as a continuously replenished container for the molten glass and that the plunger or valve 136 is raised and lowered to control the feeding of discrete charges of molten glass to the forming machine positioned therebelow. The forming machine comprises a flat base 137 having upwardly extending bars 138, 139, 140 and 141 which are located at the four corners of the generally rectangular base 137. The bars 140 and 141 serve as a support for a horizontal rail 142 and the bars 138 and 139 support a parallel rail 143. These rails serve as guides and supports for a horizontally shiftable plunger support 144, shown as a block, with a forming plunger 145 fixed to the center thereof midway between the rails 142 and 143. The support 144 extends beyond the rail 142 a distance great enough to provide a connecting surface to which a piston rod 146 is connected. The bar 141 has a lateral extension 147 formed thereon to which a fluid motor 148 is mounted. The motor 148, of which the piston 146 is a part, has a pair of supply conduits 149 and 150 connected thereto at its opposite ends, which are adapted to be alternately connected to a suitable source of fluid under pressure. Thus, it can be seen that actuation of the fluid motor will serve to selectively move the plunger 145 and its support 144 along the guide rails from the position shown in FIG. 1 to a position adjacent the upright bars 139 and 140.

The base 137 has a slot 151 formed in the top surface thereof which extends substantially the full length of the base. A pair of spaced-apart flat plates 152 and 153 are adapted to slide within this slot. Each plate has a fluid motor 154 and 155 mounted thereon.

As shown in FIG. 1, these motors are positioned vertically and have blocks 156 and 157 at the top thereof which are adapted to slide within channels or grooves 158 and 159. These grooves are formed in facing relationship in a pair of side bars 160 and 161. The side bars extend between the upright bars 141 and 140 and 138 and 139 respectively. Thus, it can be seen that the cylinders 154 and 155 are mounted relative to the base for lateral sliding movement. The motors 154 and 155 are joined together by a rod 162 so that they are constrained to move in unison. A second horizontal rod 163 is connected to the motor 155 and extends to the right, as viewed in FIG. 1, through an opening formed in a vertical support plate 164 secured to the base 137. The plate 164 serves as the mounting means for a motor 165 within which the rod 163 is adapted to extend and be connected to a piston contained therein. A pair of conduits 166 and 167 are connected to a suitable source of fluid under pressure to reciprocate the rod 163.

The motors 154 and 155 also have piston rods 168 and 169 which extend vertically therefrom. The upper ends of these rods support molds 170 and 171. The molds form open top cavities having the outer configuration of the article to be molded. Thus, it can be seen that actuation of the motors 154 and 155 will serve to reciprocate the rods 168 and 169 to raise and lower the molds 170 and 171.

Referring now to FIGS. 2–9, the sequence of operation of the apparatus of FIG. 1 is illustrated. Beginning with FIG. 2, the mold 171 is in position to be loaded with a charge of molten glass 172. At the same time the mold 170 is in pressing relationship with respect to the plunger 145. After the mold charge has been deposited in the mold 171, the mold is lowered to the position shown in FIG. 3 by the operation of the motor 155. At the same time the motor 154 is actuated to lower the mold 170. With the molds in the position shown in FIG. 3, the plunger 145 is moved to the right into alignment with the mold 171 as illustrated in FIG. 4. With the mold and plunger in alignment, the motor 155 is actuated to raise the mold 171 into pressing relationship with the plunger 145, as illustrated in FIG. 5.

Completed ware has, by this time, been removed from the mold 170. With the mold 171 and plunger 145 retained in pressing relationship, the mold 171 and the plunger are moved to the right as illustrated in FIG. 6 and the mold 170 is then raised into underlying relationship with respect to the feeder 135 and is in position to receive the next charge of glass.

When the mold 170 is charged, both molds 170 and 171 are retracted to the position shown in FIG. 7.

The plunger is then moved from the right side to the middle in alignment with the mold 170. This position is illustrated in FIG. 8.

As illustrated in FIG. 9, the motor 154 is actuated to raise the mold 170 into pressing relationship with respect to the plunger 145 while the mold 171 remains in its down position and the ware may be removed therefrom. The next step will be the shifting of the molds 170 and 171 by the shifting of the motors 154 and 155 to the left to the position illustrated in FIG. 2 and the cycle is again repeated, as set forth above.

Thus, it can be seen that applicants have provided a method and apparatus for forming glass articles from glass which is in an extremely fluid condition at the time the glass is delivered to the mold and the mold charge is prevented from splattering out of the mold during loading and is prevented from moving relative to the mold except under the influence of the pressing plunger.

Various modifications may be resorted to within the spirit and scope of the appended claims.

We claim:

1. Apparatus for press forming hollow articles from a molten glass having a relatively low viscosity comprising, in combination, a flow feeder containing said material, a mold having the exterior configuration of the article to be shaped, a base, means mounting said mold on said base for vertical and horizontal reciprocation, first motor means connected to said mold for raising said mold into close proximity to said feeder for loading the mold and for lowering the mold after loading, second motor means connected to said mold for laterally shifting said mold, a plunger, means mounting said plunger on said base for horizontal reciprocation, and third motor means connected to said plunger for horizontally reciprocating said plunger.

2. Apparatus for press forming hollow articles from a molten glass having a relatively low viscosity comprising, in combination, a flow feeder containing said material, a mold having the exterior configuration of the article to be shaped, a base positioned beneath said feeder, means mounting said mold on said base for vertical and horizontal reciprocation, first fluid motor means connected to said mold for raising said mold into close proximity to said feeder for loading the mold and for lowering the mold after loading, second fluid motor means connected to said mold for laterally shifting said mold, a plunger, means mounting said plunger on said base for horizontal reciprocation in a pre-determined plane above the lowered position of the mold, and third fluid motor means connected to said plunger for reciprocating said plunger.

3. Apparatus for press forming hollow articles from a molten glass having a relatively low viscosity comprising, in combination, a flow feeder containing said material, a pair of molds having the exterior configuration of the article to be shaped, a base, means mounting said molds on said base for individual vertical reciprocation, a pair of first motors connected to said molds for raising said molds successively into close proximity to said feeder for loading the molds and for lowering the molds after loading, means connecting said molds together for concurrent lateral shifting, a second motor mounted on said base and connected to said molds for laterally shifting said molds, a plunger, means mounting said plunger on said base for horizontal reciprocation, and a third motor mounted on said base and connected to said plunger for reciprocating said plunger, whereby one of said first pair of motors is operated to raise and lower one of said molds, said third motor is operated to move the plunger into vertical alignment with the one mold, the one first motor is operated to raise said mold into pressing relationship with respect to said plunger, and both the second and third motors are operated to laterally shift the one mold and plunger together, and shift the other first mold into loading position.

4. Apparatus for press forming hollow articles from a molten glass material having a relatively low viscosity comprising, in combination, a flow feeder containing said material, a pair of molds having the exterior configuration of the article to be shaped, a base, a first pair of vertically positioned fluid motors connected to said molds for individually raising said molds into close proximity to said feeder for loading the molds and for lowering the molds after loading, means mounting said motors on said base for horizontal reciprocation as a unit, second motor means connected between said base and said motors for laterally shifting said first motors and molds carried thereby, a plunger, means mounting said plunger on said base for horizontal reciprocation, and third motor means mounted on said base and connected to said plunger for reciprocating said plunger.

(References on following page)

References Cited

UNITED STATES PATENTS

| | | | |
|---|---|---|---|
| 1,350,375 | 8/1920 | Miller | 65—323 |
| 1,601,836 | 10/1926 | Stenhouse | 65—242 XR |
| 2,179,317 | 11/1939 | Barnard | 65—184 XR |
| 2,478,812 | 8/1949 | Drake | 65—246 XR |

DONALL H. SYLVESTER, *Primary Examiner.*

F. W. MIGA, *Assistant Examiner.*